(12) United States Patent
Sand et al.

(10) Patent No.: US 8,081,571 B2
(45) Date of Patent: *Dec. 20, 2011

(54) FLOW ADMISSION CONTROL IN AN IP NETWORK

(75) Inventors: Allan Sand, Woodlawn (CA); Jozef Babiarz, Stittsville (CA); Dany Sylvain, Gatineau (CA)

(73) Assignee: Rockstar BIDCO, LP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/728,459

(22) Filed: Mar. 22, 2010

(65) Prior Publication Data

US 2010/0177636 A1      Jul. 15, 2010

Related U.S. Application Data

(63) Continuation of application No. 10/883,207, filed on Jul. 1, 2004, now Pat. No. 7,684,322.

(51) Int. Cl.
*H04L 12/26* (2006.01)

(52) U.S. Cl. .............................. 370/230; 370/395.2

(58) Field of Classification Search .................. 370/230, 370/232, 252, 255, 256; 709/225, 235; 714/4
See application file for complete search history.

(56) References Cited

U.S. PATENT DOCUMENTS

| | | | | |
|---|---|---|---|---|
| 5,335,222 A | * | 8/1994 | Kamoi et al. | 370/230 |
| 5,485,455 A | * | 1/1996 | Dobbins et al. | 370/255 |
| 5,521,910 A | * | 5/1996 | Matthews | 370/256 |
| 6,046,981 A | * | 4/2000 | Ramamurthy et al. | 370/232 |
| 6,084,858 A | | 7/2000 | Matthews et al. | |
| 6,643,269 B1 | | 11/2003 | Fan et al. | |
| 6,802,020 B1 | * | 10/2004 | Smith | 714/4 |
| 2003/0091029 A1 | * | 5/2003 | Jo et al. | 370/352 |
| 2003/0123388 A1 | * | 7/2003 | Bradd | 370/230 |
| 2004/0059827 A1 | * | 3/2004 | Chiang et al. | 709/235 |
| 2005/0044218 A1 | * | 2/2005 | Couturier | 709/225 |

OTHER PUBLICATIONS

Zhi-Li Zhang et al, Decoupling QoS Control from Core Routers: A Novel Bandwidth Broker Architecture for Scalable Support of Guaranteed Services, Sigcomm '00, Stockholm, Sweden, Copuright 2000, ACM 1-58113-224-7/00/0008, pp. 71-83.*
Non-Final Rejection mailed Oct. 9, 2007, for U.S. Appl. No. 10/883,207.
Final Rejection mailed Apr. 16, 2008, for U.S. Appl. No. 10/883,207.
Non-Final Rejection mailed Oct. 17, 2008, for U.S. Appl. No. 10/883,207.
Final Rejection mailed Jun. 10, 2009, for U.S. Appl. No. 10/883,207.
Notice of Allowance mailed Dec. 31, 2009, for U.S. Appl. No. 10/883,207.

* cited by examiner

*Primary Examiner* — Andrew Lai

(74) *Attorney, Agent, or Firm* — Withrow & Terranova, PLLC

(57) ABSTRACT

A flow admission control module for IP traffic types monitors network topology and usage. A new flow is not admitted if it is determined that the flow would push the utilization of available bandwidth reserved for the traffic type on a link in the associated path beyond a predetermined threshold. The admission control module may, as a result of dynamic changes to network topology capacity, re-compute the link utilization for effected active flows The admission control module may also account for protection regimes in flow admission calculations.

18 Claims, 5 Drawing Sheets

Matrix 36

| Flow Identification GW (IP) pairs | | Network Link Bandwidth (call-bandwidth units) | | | | | | | | |
|---|---|---|---|---|---|---|---|---|---|---|
| | | Link 1 | Link 2 | Link 3 | Link 4 | Link 5 | Link 6 | Link 7 | Link 8 | Link 9 |
| Forward | Available call bandwidth | 25 | 25 | 25 | 35 | 25 | 25 | 40 | 35 | 60 |
| | Threshold | 20 | 20 | 20 | 30 | 20 | 20 | 35 | 30 | 55 |
| GW 1 to GW 2 | Bandwidth used by the aggregate of active calls | | | | 25 | | | | 25 | |
| GW 1 to GW 3 | Bandwidth used by the aggregate of active calls | | | 8 | | 8 | 8 | | | 8 |
| GW 2 to GW 3 | Bandwidth used by the aggregate of active calls | | | | | | | 35 | | 35 |
| Reverse | Available call bandwidth | 25 | 25 | 25 | 35 | 25 | 25 | 40 | 35 | 60 |
| | Threshold | 20 | 20 | 20 | 30 | 20 | 20 | 35 | 30 | 55 |
| GW 1 to GW 2 | Bandwidth used by the aggregate of active calls | | | | 25 | | | | 25 | |
| GW 1 to GW 3 | Bandwidth used by the aggregate of active calls | | | 8 | | 8 | 8 | | | 8 |
| GW 2 to GW 3 | Bandwidth used by the aggregate of active calls | | | | | | | 35 | | 35 |

*Figure 2*

Matrix 36 with link 6 failed

| Flow Identification GW (IP) pairs | | Network Link Bandwidth (call bandwidth units) | | | | | | | | |
|---|---|---|---|---|---|---|---|---|---|---|
| | | Link 1 | Link 2 | Link 3 | Link 4 | Link 5 | Link 6 | Link 7 | Link 8 | Link 9 |
| Forward | Available call bandwidth | 25 | 25 | 25 | 35 | 25 | 25 | 40 | 35 | 60 |
| | Threshold | 20 | 20 | 20 | 30 | 20 | 20 | 35 | 30 | 55 |
| GW 1 to GW 2 | Bandwidth used by the aggregate of active calls | | | | 25 | | | | 25 | |
| GW 1 to GW3 | | | | 8 | | 8 | (8) | 8 | 8 | 8 |
| GW 2 to GW 3 | | | | | | | | 35 | | 35 |
| Reverse | Available call bandwidth | 25 | 25 | 25 | 35 | 25 | 25 | 40 | 35 | 60 |
| | Threshold | 20 | 20 | 20 | 30 | 20 | 20 | 35 | 30 | 55 |
| GW 1 to GW 2 | Bandwidth used by the aggregate of active calls | | | | 25 | | | | 25 | |
| GW 1 to GW3 | | | | 8 | | 8 | (8) | 8 | 8 | 8 |
| GW 2 to GW 3 | | | | | | | | 35 | | 35 |

*Figure 4*

FLOW ADMISSION CONTROL IN AN IP NETWORK

CROSS-REFERENCE TO RELATED APPLICATION

This application is a continuation of U.S. application Ser. No. 10/883,207, filed Jul. 1, 2004, now U.S. Pat. No. 7,684,322.

FIELD OF THE INVENTION

This invention is generally related to Internet Protocol ("IP") communications, and more particularly to flow admission control in an IP communications network carrying different traffic types, such as voice, that can require some minimum transmission behavior to meet the traffic performance requirements.

BACKGROUND OF THE INVENTION

IP telephony has been a focus of research and development in the telecommunications industry for years. One reason the technology has been a focus is because of potential advantages such as converging voice and data networks, simplifying equipment and reducing management requirements, thereby reducing capital expenditures and operating expenditures. However, the deployment of certain services such as IP telephony services has been complicated because the protocol lacks some of the features of protocols specifically developed for support of telephony such as Asynchronous Transfer Mode ("ATM").

One particular feature that is not a fundamental part of the IP protocol is admission control. It is known to employ a static model of IP network capacity in conjunction with calculated over-provisioning and special quality of service techniques such as per-flow bandwidth reservation or class-of-service per-hop queuing-priority behavior to help avoid a situation where so many IP flows are handled by a network that the IP flows suffers delays or packet loss due to congestion. However, network usage and topology are not static, and over-subscription from high volume can result in degraded service quality and even service failure.

SUMMARY OF THE INVENTION

In accordance with the present invention, network resources, topology and usage in an IP network are monitored, and a new flow, such as a voice call, is not admitted if it is determined that the flow would push the usage beyond a predetermined threshold relative to the amount of network bandwidth pre-provisioned for the relevant traffic type. If admittance of the flow would push usage beyond the threshold, the flow is not admitted. If admittance of the flow would not push usage beyond the threshold, the flow is admitted.

The invention advantageously provides flow admission control in an IP network for traffic flows requiring some minimum transmission performance, such as voice, video, gaming, etc. The invention relies on one part on the ability of the IP network elements to provide prioritized and preferential treatment to certain type of IP packets. If the aggregate of these prioritized IP packet flows does not exceed a predetermined percentage of the network capacity, the prioritized packets will be transmitted within a known performance envelope by the network. For example, in a voice over IP (VoIP) telephony implementation, the VoIP traffic can be differentiated from other flows via IP packet inspection, using for example DiffServ packet marking, enabling differentiated prioritization of the VoIP IP flow by the IP network elements. The network topology transited by one VoIP IP flow may be referred as the route or the path. In an IP network, the route used by a VoIP flow can be derived based on the VoIP packet IP destination address and knowledge of the topology and routing protocol policies of the IP network. Further the route can be different between the forward and reverse directions. Further, the amount of bandwidth (both forward and reverse) required for a VoIP call can be determined. Hence, admission control decisions may be made by maintaining a running count of the bandwidth used by active VoIP calls on each of the links between nodes along its route and comparing that number with the pre-provisioned bandwidth limit for each link. Since each link may have different usage at the time of VoIP call setup and a separate predetermined threshold, the determination of whether the call would push usage beyond the threshold is made for each link in the route. In particular, the call is permitted for the route only if a determination is made that the call will not increase usage beyond the threshold on each and every link in the path. This approach to admission control can be extended to multiple service controllers and multiple service types.

The present invention is an improvement over existing techniques because actual usage is employed to provide admission control, rather than employing an engineered estimate of probable usage and no admission control.

Another advantage of the present invention is that network monitoring is dynamic. Routes may change recurrently due to network upgrades, but even more abruptly in the case of link or node failure. Dynamic monitoring recognizes such changes and may account for the potential effects of the failure of links and nodes in the network. For example, alternate routes may be re-calculated for each active call and used to determine the resulting utilization of each associated link in the event of the failure of one or more links. This information can be employed to adjust the call admission threshold.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 2 is a link utilization matrix utilized by the flow admission control module of FIG. 1.

FIG. 4 is the updated link utilization matrix of FIG. 2 as computed in response to the failure of link 6.

DETAILED DESCRIPTION OF EXEMPLARY EMBODIMENTS

Figure 1:
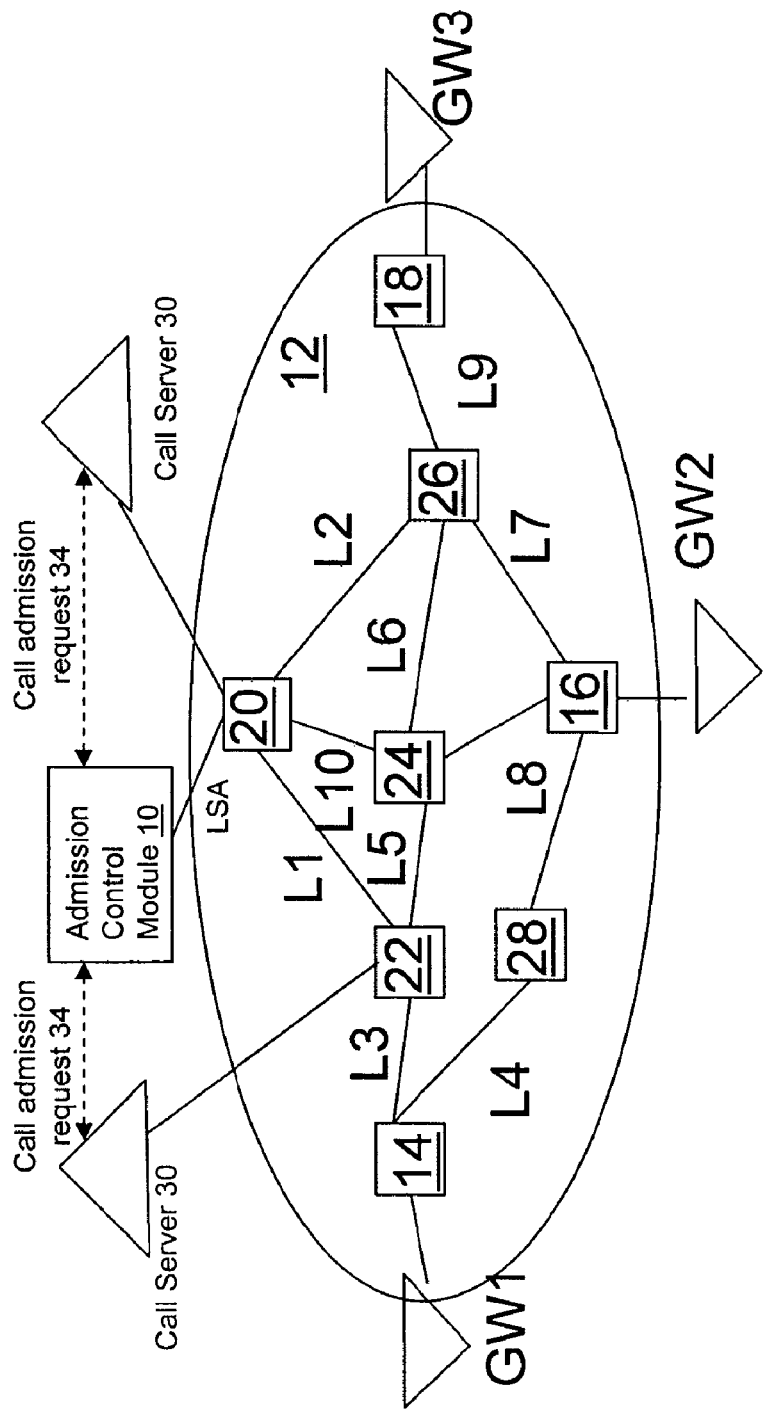
FIG. 1 is a block diagram of a flow admission control module in use with an IP network.

FIG. 1 illustrates operation of a flow admission control module 10 in conjunction with an IP network 12. The network includes a plurality of nodes, such as edge nodes 14, 16, 18 and core nodes 20, 22, 24, 26, 28, some of which are interconnected via links L1, L2, L3, L4, L5, L6, L7, L8, L9, L10. Public switched telephony network (PSTN) subscribers (i.e. telephony callers) are connected to edge nodes via telephony to IP gateways GW1, GW2, GW3. One or multiple call servers 30 are employed to manage IP telephony calls carried by the network 12. The call server 30 interacts with the flow admission control module 10 to perform admission control. It should be noted that while the invention is being described with regard to support of voice calls, the admission control module could also be utilized in conjunction with other call flows benefiting from admission control such as video and bandwidth-sensitive data as already mentioned.

The admission control module 10 monitors and maintains data indicating the traffic flow forwarding attributes of the nodes of each type and their respective interconnecting links. In particular, the admission control module monitors which nodes and links of each type are active in the network. For example, the admission control module may utilize a protocol such as Simple Network Management Protocol ("SNMP") to query nodes for information. Alternatively, the admission control module may monitor messages multicast by nodes such as Link State Updates ("LSUs") or MPLS label distribution messages to obtain the information. The capacity of the links in the network in terms of available bandwidth, i.e., the amount of bandwidth allocated for traffic type by a control mechanism such as class of service ("CoS") or quality of service ("QoS") may be learned or preloaded into the admission control module.

Admission control decisions are made based on network topology, available bandwidth, and the amount of available bandwidth being utilized. In the illustrated embodiment, call admission control is triggered by a call setup procedure which is executed before a call is established through the network. The purpose of the call setup procedure is to determine whether or not to setup the call. The call server 30 manages the call setup procedure in response to standard telephony signals such as ISUP (ISDN user part), ITU H.248 or IETF SIP (Session Invitation Protocol, RFC 3261) received from the gateways GW1,2, 3 or a signaling network such as SS7 (not shown). To determine whether a call can be admitted, the call server 30 identifies the source and destination gateways (GW1,2,3) IP address to the admission control module 10 and the required bandwidth for the call via a signal 34. In response to signaling from the call server, the admission control module performs admission control calculations.

The first admission control calculation is to determine the edge to edge-GW path in terms of transit links based on the network's IP traffic forwarding protocols and policies. For example, the network's nodes may use Open Shortest Path First ("OSPF") protocol; in which case the admission control module would calculate the paths by utilizing the same Open Shortest Path First ("OSPF") protocol. There are several techniques to simplify and hence speed up the necessary calculations. For example Classless Inter-Domain Routing (CIDR) may be used to group GWs located in a 'stub' network i.e. where the group of GWs is all reachable through a single CIDR IP address.

In an alternate embodiment of the first calculation, all possible paths between GW pairs are initially computed i.e. before the admission control module is put into service, and stored apriori in matrix 36 (FIG. 2). Further the admission control calculation adjusts the available bandwidth to take into account any purpose-built pre-provisioned protection link capacity. As a result, the path calculation is simply a look-up into matrix 36.

Figure 3:
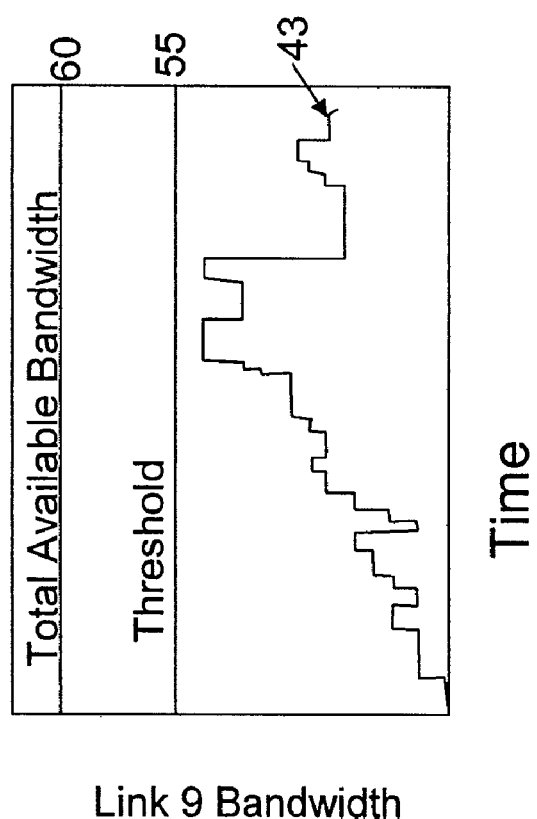
FIG. 3 is graphical illustration of link utilization versus threshold information used by the flow admission control module of FIG. 1.

The second admission control calculation performed by the admission control module compares utilization of available bandwidth inclusive of the proposed call with a predetermined threshold. Utilization may be determined by monitoring call set-up and tear down. In other words, a running total of the bandwidth utilized by active calls may be maintained from zero at the time of pre-provisioning or some other time=0, incrementing the total for each admitted call by the amount of bandwidth required for the call type, and decrementing the total for each terminated call by the amount of bandwidth required for the call type. The threshold is predetermined, and may be set based on total available bandwidth as shown in FIGS. 2 and 3. Although utilization and total available bandwidth are shown in units of bandwidth such as bits per second in the illustrated example, the values could also be monitored and stored in units of number of calls where call bandwidth was a fixed amount. In the case where a threshold is shown in terms of bandwidth, the second admission control calculation includes determining whether the additional call would cause utilization to exceed the threshold number of calls for each link in the most likely path. If a determination is made that the threshold would be exceeded on at least one of the links, the admission control module signals the call server to refuse the call setup. If a determination is made that the threshold would not be exceeded on any of the links in the path, the admission control module signals the call server to admit the call. Consequently, each admitted call is assured at least a predetermined minimum necessary bandwidth provided there are no network failures.

In another embodiment the threshold is further adjusted to allow some 'head-room' for calls that might arrive while the matrix is re-synchronizing due to a dynamic topology change. In response to dynamic changes in network topology and or link capacity from the pre-provisioned amount at time t=0, the admission control module re-computes matrix 36 for all active calls. The first computation is to evaluate the scope of the topology change in terms of urgency and impact on active calls. For example, suppose link L6 had purpose-built protection bandwidth on link L10 and link L2 equivalent to that pre-provisioned for link L6. Now suppose link L6 failed. As a result active calls are quickly redirected with no impact, over the purpose-built protection route. Hence, no call path re-computations are required. If however, it is determined that the topology change will result in active calls transitting link L6, being rerouted by the network nodes; a second calculation is made to determine the new route (i.e. transited links) for active calls. Until the calculations are complete the matrix is considered stale and there exists a possibility of admitting calls over a route with insufficient bandwidth. To mitigate this possibility of running out of bandwidth during this period, 'head room' may be added to the admission control bandwidth utilization threshold in accordance with the duration of the stale period and taking into account the rate at which new calls arrive. Further, there exist techniques to speeding up the necessary computations. For example, the computation can be prioritized for effected active calls first (i.e. those that will be rerouted as a result of a link or node failure) followed by new calls until eventually the matrix is completed.

A specific example will now be described with respect to FIGS. 1, 2, 3 and 4 for the sake of completeness. When a call is initiated from outside the network via gateway GW1 to a destination outside the network for which gateway GW3 is along the path to the destination, gateway GW1 initially signals to the call server 30 that a call setup request has been received to establish a call that traverses the network from gateway GW1 to gateway GW3. The call server 30 then signals the admission control module 10 to perform admission control calculations. The admission control module calculates the path based on knowledge of the topology and routing protocol policies of the IP network. For example, if the network employs OSPF to determine routing policies then, the admission control module calculates the transited links, by performing a Djikstra (shortest path first) computation from the perspective of node 14 in the forward direction and node 18 in the reverse direction. For this example, suppose that the result of the path computation from gateway GW1 to gateway GW3 is L3-L5-L6-L9. In the second calculation the admission control module compares utilization inclusive of the proposed call with a respective predetermined threshold for each link. As indicated in the matrix 36, link L3 is currently handling 8 call-units of bandwidth of a maximum, i.e., threshold, 20 call-units of bandwidth. Similarly, links L5 and L6 are currently handling 8 of a maximum 20 call-units of bandwidth. Link L9, which supports both the paths from GW1-GW3 and GW2-GW3 is currently handling 43, i.e., (8+35), of a maximum 55 calls. Therefore, the admission control module 10 signals the call server 30 to admit the call and increments the utilization count of each link, i.e., L1, L5 and L6 to 9/20, and L9 to 9/55. In view of this example it will be apparent that if the proposed new call were from gateway GW2 to gateway GW3 the admission control module 10 would signal the call server 30 to deny admittance of the call because link L7 is currently handling 35 of a maximum 35 calls.

Figure 5:
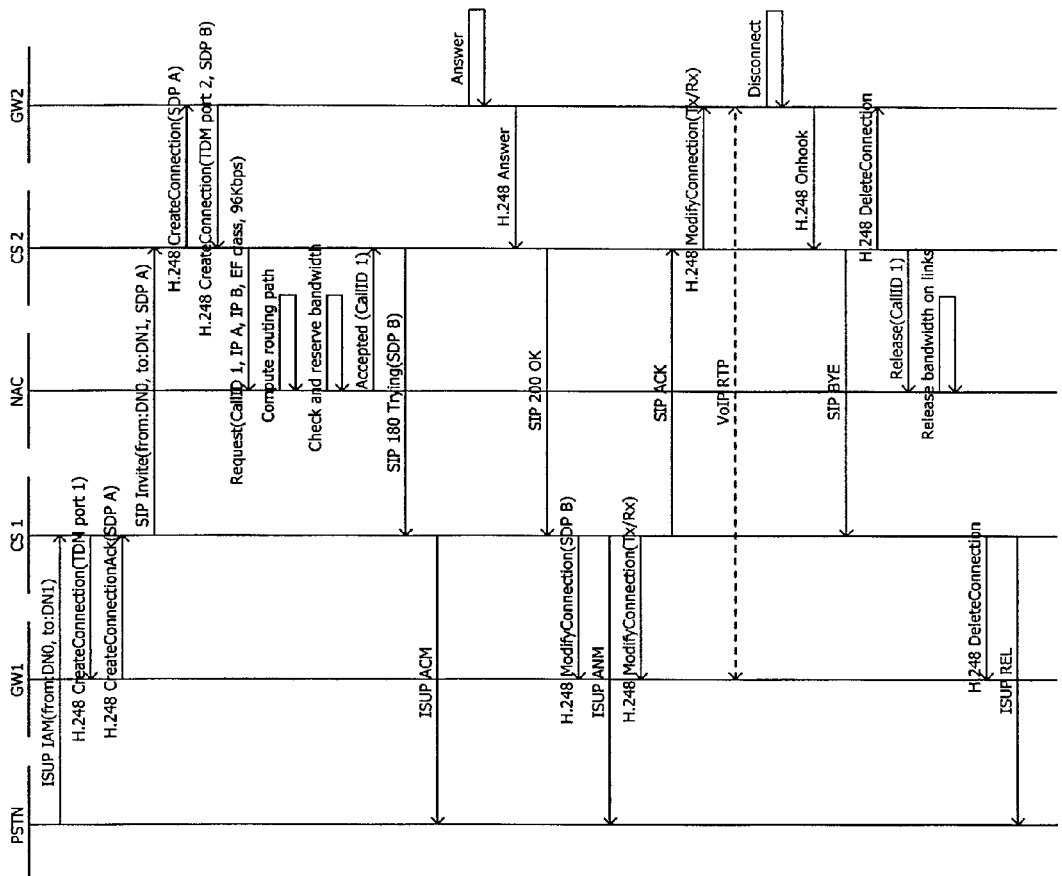
FIG. 5 is a call flow diagram.

FIG. 5 illustrates call flow control for establishing a call traversing between GW1 and GW2 (FIG. 1). Initially, an ISUP initial address message (IAM) is sent via the PSTN to a first call server 30 (FIG. 1), now referred to as CS1, to "reserve" bandwidth from GW1 to GW2. The IAM includes the originating point code, destination point code, "circuit" identification code, dialed digits and, optionally, the calling party number and name. In response to the ISUP IAM message, an H.248 CreateConnection message is sent from CS1 to GW1, and GW1 responds with an acknowledgment message. Following receipt of the acknowledgment message, a Session Initiation Protocol ("SIP") Invite message is sent from CS1 to a second call server 30 (FIG. 1), now referred to as CS2. The message may include a description of the session the caller wishes to set up, including the path taken by the request through proxies so far. In response, an H.248 CreateConnection message is sent from CS2 to GW2, which is subsequently acknowledged via a message from GW2 to CS2. Following receipt of the acknowledgment message, CS2 sends a request message to admission control. The request message indicates a call identifier, a source IP address, a destination IP address, a service class identifier and bandwidth requirement. In response, network admission control ("NAC") computes the routing path in accordance with one of the techniques described above, checks and reserves bandwidth in accordance with one of the techniques described above, and sends a request accepted message to CS2. A SIP 180 Trying (ringing) message is then sent from CS2 to CS1. An ISUP Address Complete Message is then sent from CS1 to the PSTN source.

When the called party answers, an H.248 Answer message is sent from GW2 to CS2, following which a SIP 200 OK message is sent from CS2 to CS1. Subsequently, a series of messages including H.248 ModifyConnection (SDP B), ISUP Answer Message, H.248 ModifyConnection(Tx/Rx), SIP ACK, H.248 ModifyConnection(Tx/Rx) are sent in accordance with the protocols as shown and the call occurs.

When a call disconnect is signaled to GW2, an H.248 Onhook message is sent from GW2 to CS2. CS2 then sends a SIP BYE message to CS1, and an H.248 DeleteConnection message to GW2, and a Release message to admission control including the call identifier. Admission control then releases the bandwidth on the links associated with the identified call and updates the utilization tables. In response to the SIP BYE message CS1 sends an H.248 DeleteConnection message to GW1 and an ISUP Release message to the PSTN source.

In an alternative embodiment the call admission control module 10 determines the path for all possible calls a-priori to any calls being set up. The determination is made in accordance with the network topology, routing protocols and policies in place at that time. In this embodiment the admission control module need not calculate the path as discussed above unless there is a change in the topology or routing policies in the network. However, unlike the previous embodiment, when a call set up request is signaled to the call admission control module it simply does a lookup into matrix 36 to determine whether to admit the call.

In another alternative embodiment the admission control module 10 performs link failure analysis. Link failure analysis includes calculating the impact of rerouting of traffic to alternate paths in the event of link failure. It will be appreciated that this calculation will indicate whether the alternate paths have sufficient unused bandwidth to handle the rerouted traffic. If, for example, link L6 where to fail, the admission control module would, as soon as it were to learn of the failure, begin to compute the new routes for all affected active calls. In this example, the admission control module examines matrix 36 and determines that only affected active calls are between GW1 to GW3. The resultant matrix is shown in FIG. 4. In this example it is supposed that the resultant Djikstra computation yields the new route between GW1 to GW3 transits links L3, L5, L7, L8 and L9.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. An Internet Protocol (IP) routed communication network, comprising:
   a plurality of communication links;
   a plurality of network nodes operable to calculate a path for routing IP packets between the network nodes over the communication links; and
   a flow admission controller operable to:
     monitor bandwidth allocated to flows of at least one traffic type on the communication links;
     calculate, independently of path calculation by the network nodes and by predicting which path will be used by the network nodes, at least one path traversing at least one communication link between a source node and a destination node for a new flow;
     determine, for each communication link of the at least one path, whether admittance of the new flow would push usage beyond a predetermined threshold relative to network bandwidth pre-provisioned for the flows of the at least one traffic type; and
     indicate that the new flow would push the usage beyond the predetermined threshold if it is determined that the admittance of the new flow would push the usage beyond the predetermined threshold.

2. The IP routed communication network as defined in claim 1, wherein the flow admission controller is further operable to determine, in terms of transit links, which path the new flow would use prior to the determination of whether the admittance of the new flow would push the usage beyond the predetermined threshold.

3. The IP routed communication network as defined in claim 2, wherein the flow admission controller is operable to compare utilization of available bandwidth inclusive of the new flow on the transit links in the at least one path with predetermined thresholds of each transit link.

4. The IP routed communication network as defined in claim 2, wherein the flow admission controller is operable to employ at least one forwarding protocol used by the IP routed communication network to calculate the at least one path.

5. The IP routed communication network as defined in claim 2, wherein the flow admission controller employs a pre-calculated matrix of possible paths.

6. The IP routed communication network as defined in claim 5, wherein the flow admission controller is operable to temporarily adjust the predetermined threshold while the pre-calculated matrix is re-synchronized following a dynamic change in network topology.

7. The IP routed communication network as defined in claim 1, wherein the flow admission controller is operable to maintain data indicating traffic flow forwarding attributes of network nodes and their respective interconnecting communication links in the IP routed communication network.

8. The IP routed communication network as defined in claim 1, wherein the flow admission controller is operable to perform link failure analysis and to employ results of the link failure analysis in the determination of whether the admittance of the new flow would push the usage beyond the predetermined threshold relative to the network bandwidth pre-provisioned for the flows of the at least one traffic type.

9. A method of operating an Internet Protocol (IP) routed communication network, the IP routed communication network comprising a plurality of communication links, a plurality of network nodes, and a flow admission controller, the method comprising:
calculating a path for routing IP packets between the network nodes over the communication links;
monitoring bandwidth allocated to flows of at least one traffic type on the communication links;
calculating, independently of path calculation by the network nodes and by predicting which path will be used by the network nodes, at least one path traversing at least one communication link between a source node and a destination node for a new flow;
determining, for each communication link of the calculated path, whether admittance of the new flow would push usage beyond a predetermined threshold relative to network bandwidth pre-provisioned for the flows of the at least one traffic type; and
indicating that the new flow would push the usage beyond the predetermined threshold if it is determined that the admittance of the new flow would push the usage beyond the predetermined threshold.

10. The method as defined in claim 9, comprising determining, in terms of transit links, which path the new flow would use prior to the determination of whether the admittance of the new flow would push the usage beyond the predetermined threshold.

11. The method as defined in claim 10, comprising comparing utilization of available bandwidth inclusive of the new flow on the transit links in the at least one path with predetermined thresholds of each transit link.

12. The method as defined in claim 10, comprising employing at least one forwarding protocol used by the IP routed communication network to calculate the at least one path.

13. The method as defined in claim 10, comprising employing a pre-calculated matrix of possible paths.

14. The method as defined in claim 13, comprising temporarily adjusting the predetermined threshold while the pre-calculated matrix is re-synchronized following a dynamic change in network topology.

15. The method as defined in claim 9, comprising maintaining data indicating traffic flow forwarding attributes of network nodes and their respective interconnecting communication links in the IP routed communication network.

16. The method as defined in claim 9, comprising performing link failure analysis and to employ results of the link failure analysis in the determination of whether the admittance of the new flow would push the usage beyond the predetermined threshold relative to the network bandwidth pre-provisioned for the flows of the at least one traffic type.

17. The method as defined in claim 9, wherein the step of calculating the path for routing the IP packets between the network nodes is performed at least one network node.

18. The method as defined in claim 9, wherein the steps of monitoring the bandwidth, calculating the at least one path for the new flow, determining whether the admittance of the new flow would push the usage beyond the predetermined threshold, and indicating that the new flow would push the usage beyond the predetermined threshold are performed at least one flow admission controller.

* * * * *